(12) United States Patent
Miller

(10) Patent No.: US 10,921,676 B2
(45) Date of Patent: Feb. 16, 2021

(54) ELECTROPHORETIC MEDIUM

(71) Applicant: E Ink Corporation, Billerica, MA (US)

(72) Inventor: David Darrell Miller, Wakefield, MA (US)

(73) Assignee: E Ink Corporation, Billerica, MA (US)

( * ) Notice: Subject to any disclaimer, the term of this patent is extended or adjusted under 35 U.S.C. 154(b) by 195 days.

(21) Appl. No.: 16/115,997

(22) Filed: Aug. 29, 2018

(65) Prior Publication Data

US 2019/0064625 A1  Feb. 28, 2019

Related U.S. Application Data

(60) Provisional application No. 62/551,959, filed on Aug. 30, 2017.

(51) Int. Cl.
*G02F 1/167* (2019.01)
*G02F 1/1675* (2019.01)
*G02F 1/1681* (2019.01)

(52) U.S. Cl.
CPC .......... *G02F 1/167* (2013.01); *G02F 1/1681* (2019.01); *G02F 2001/1678* (2013.01)

(58) Field of Classification Search
CPC .... G02F 1/167; G02F 2001/1687; G02F 1/03; G02F 1/061; H01B 1/06; H01B 1/20; H01B 1/121; H01B 1/122; H01B 1/124; H01B 1/04
USPC ........... 359/290–297, 253–254, 298; 345/45, 345/105, 107; 349/33; 430/31–32; 252/500–521.6
See application file for complete search history.

(56) References Cited

U.S. PATENT DOCUMENTS

| | | |
|---|---|---|
| 4,418,346 A | 11/1983 | Batchelder |
| 5,411,656 A | 5/1995 | Schubert |
| 5,453,121 A | 9/1995 | Nicholls |
| 5,457,002 A | 10/1995 | Beach |
| 5,582,700 A | 12/1996 | Bryning |
| 5,872,552 A | 2/1999 | Gordon, II |
| 5,961,804 A | 10/1999 | Jacobson |
| 6,017,584 A | 1/2000 | Albert |
| 6,120,588 A | 9/2000 | Jacobson |
| 6,120,839 A | 9/2000 | Comiskey |
| 6,130,774 A | 10/2000 | Albert |
| 6,144,361 A | 11/2000 | Gordon, II |
| 6,172,798 B1 | 1/2001 | Albert |

(Continued)

FOREIGN PATENT DOCUMENTS

| | | |
|---|---|---|
| KR | 20120131490 A | 12/2012 |
| KR | 20130080539 A | 7/2013 |

OTHER PUBLICATIONS

Korean Intellectual Property Office, PCT/US2018/048772, International Search Report and Written Opinion, dated Dec. 9, 2018.

*Primary Examiner* — Kristina M Deherrera
(74) *Attorney, Agent, or Firm* — Ioannis Constantinides

(57) ABSTRACT

An electrophoretic medium comprises a plurality of charged particles disposed in a fluid. The fluid comprises at least about 75, and preferably at least about 95, percent by weight of a hydrocarbon selected from monounsaturated nonenes, nonane and methyloctane. The electrophoretic medium is especially useful in microcell electrophoretic media comprising a substrate having a plurality of cavities, and a sealing layer closing the open ends of the cavities, the cavities being filled with the electrophoretic medium.

9 Claims, 4 Drawing Sheets

(56) References Cited

U.S. PATENT DOCUMENTS

| | | |
|---|---|---|
| 6,184,856 B1 | 2/2001 | Gordon, II |
| 6,225,971 B1 | 5/2001 | Gordon, II |
| 6,262,706 B1 | 7/2001 | Albert |
| 6,262,833 B1 | 7/2001 | Loxley |
| 6,271,823 B1 | 8/2001 | Gordon, II |
| 6,300,932 B1 | 10/2001 | Albert |
| 6,323,989 B1 | 11/2001 | Jacobson |
| 6,377,387 B1 | 4/2002 | Duthaler |
| 6,515,649 B1 | 2/2003 | Albert |
| 6,538,801 B2 | 3/2003 | Jacobson |
| 6,580,545 B2 | 6/2003 | Morrison |
| 6,652,075 B2 | 11/2003 | Jacobson |
| 6,672,921 B1 | 1/2004 | Liang |
| 6,693,620 B1 | 2/2004 | Herb |
| 6,721,083 B2 | 4/2004 | Jacobson |
| 6,727,881 B1 | 4/2004 | Albert |
| 6,751,007 B2 | 6/2004 | Liang |
| 6,753,067 B2 | 6/2004 | Chen |
| 6,781,745 B2 | 8/2004 | Chung |
| 6,788,452 B2 | 9/2004 | Liang |
| 6,795,229 B2 | 9/2004 | Liang |
| 6,806,995 B2 | 10/2004 | Chung |
| 6,822,782 B2 | 11/2004 | Honeyman |
| 6,829,078 B2 | 12/2004 | Liang |
| 6,831,771 B2 | 12/2004 | Ho |
| 6,833,177 B2 | 12/2004 | Chen |
| 6,850,355 B2 | 2/2005 | Liang |
| 6,865,012 B2 | 3/2005 | Liang |
| 6,866,760 B2 | 3/2005 | Paolini, Jr. |
| 6,870,661 B2 | 3/2005 | Pullen |
| 6,870,662 B2 | 3/2005 | Tseng |
| 6,885,495 B2 | 4/2005 | Liang |
| 6,906,779 B2 | 6/2005 | Chan-Park |
| 6,914,713 B2 | 7/2005 | Chung |
| 6,922,276 B2 | 7/2005 | Zhang |
| 6,927,892 B2 | 8/2005 | Ho |
| 6,930,818 B1 | 8/2005 | Liang |
| 6,933,098 B2 | 8/2005 | Chan-Park |
| 6,947,202 B2 | 9/2005 | Liang |
| 6,956,690 B2 | 10/2005 | Yu |
| 6,958,849 B2 | 10/2005 | Chen |
| 6,982,178 B2 | 1/2006 | LeCain |
| 6,987,605 B2 | 1/2006 | Liang |
| 7,002,728 B2 | 2/2006 | Pullen |
| 7,012,600 B2 | 3/2006 | Zehner |
| 7,038,655 B2 | 5/2006 | Herb |
| 7,046,228 B2 | 5/2006 | Liang |
| 7,052,766 B2 | 5/2006 | Zang |
| 7,072,095 B2 | 7/2006 | Liang |
| 7,075,502 B1 | 7/2006 | Drzaic |
| 7,079,303 B2 | 7/2006 | Hou |
| 7,079,305 B2 | 7/2006 | Paolini, Jr. et al. |
| 7,110,162 B2 | 9/2006 | Wu |
| 7,113,323 B2 | 9/2006 | Ho |
| 7,116,318 B2 | 10/2006 | Amundson |
| 7,141,279 B2 | 11/2006 | Liang |
| 7,141,688 B2 | 11/2006 | Feng |
| 7,142,351 B2 | 11/2006 | Chung |
| 7,144,942 B2 | 12/2006 | Zang |
| 7,156,945 B2 | 1/2007 | Chaug |
| 7,170,670 B2 | 1/2007 | Webber |
| 7,180,649 B2 | 2/2007 | Morrison |
| 7,205,355 B2 | 4/2007 | Liang |
| 7,226,550 B2 | 6/2007 | Hou |
| 7,230,750 B2 | 6/2007 | Whitesides |
| 7,230,751 B2 | 6/2007 | Whitesides |
| 7,233,429 B2 | 6/2007 | Liang |
| 7,236,290 B1 | 6/2007 | Zhang |
| 7,247,379 B2 | 7/2007 | Pullen |
| 7,261,920 B2 | 8/2007 | Haubrich |
| 7,271,947 B2 | 9/2007 | Liang |
| 7,277,218 B2 | 10/2007 | Hwang |
| 7,286,279 B2 | 10/2007 | Yu |
| 7,304,780 B2 | 12/2007 | Liu |
| 7,307,778 B2 | 12/2007 | Wang |
| 7,312,784 B2 | 12/2007 | Baucom |
| 7,312,916 B2 | 12/2007 | Pullen |
| 7,327,346 B2 | 2/2008 | Chung |
| 7,339,715 B2 | 3/2008 | Webber |
| 7,347,957 B2 | 3/2008 | Wu |
| 7,375,875 B2 | 5/2008 | Whitesides |
| 7,382,514 B2 | 6/2008 | Hsu |
| 7,390,901 B2 | 6/2008 | Yang |
| 7,405,865 B2 | 7/2008 | Ogiwara |
| 7,411,719 B2 | 8/2008 | Paolini, Jr. |
| 7,411,720 B2 | 8/2008 | Honeyman et al. |
| 7,453,445 B2 | 11/2008 | Amundson |
| 7,470,386 B2 | 12/2008 | Kang |
| 7,473,782 B2 | 1/2009 | Yang |
| 7,504,050 B2 | 3/2009 | Weng |
| 7,532,388 B2 | 5/2009 | Whitesides et al. |
| 7,532,389 B2 | 5/2009 | Li |
| 7,535,624 B2 | 5/2009 | Amundson et al. |
| 7,545,557 B2 | 6/2009 | Iftime |
| 7,572,394 B2 | 8/2009 | Gu |
| 7,576,903 B2 | 8/2009 | Yamamoto |
| 7,576,904 B2 | 8/2009 | Chung |
| 7,580,180 B2 | 8/2009 | Ho |
| 7,679,814 B2 | 3/2010 | Paolini, Jr. |
| 7,715,087 B2 | 5/2010 | Hou |
| 7,715,088 B2 | 5/2010 | Liang |
| 7,746,544 B2 | 6/2010 | Comiskey |
| 7,767,112 B2 | 8/2010 | Hou |
| 7,767,126 B2 | 8/2010 | Kang |
| 7,839,564 B2 | 11/2010 | Whitesides et al. |
| 7,848,006 B2 | 12/2010 | Wilcox |
| 7,880,958 B2 | 2/2011 | Zang |
| 7,903,319 B2 | 3/2011 | Honeyman |
| 7,940,450 B2 | 5/2011 | Hong |
| 7,951,938 B2 | 5/2011 | Yang |
| 8,002,948 B2 | 8/2011 | Haubrich |
| 8,009,348 B2 | 8/2011 | Zehner |
| 8,018,640 B2 | 9/2011 | Whitesides |
| 8,115,729 B2 | 2/2012 | Danner |
| 8,154,790 B2 | 4/2012 | Wang |
| 8,169,690 B2 | 5/2012 | Lin |
| 8,199,395 B2 | 6/2012 | Whitesides |
| 8,257,614 B2 | 9/2012 | Gu |
| 8,270,064 B2 | 9/2012 | Feick |
| 8,305,341 B2 | 11/2012 | Arango |
| 8,361,620 B2 | 1/2013 | Zang |
| 8,363,306 B2 | 1/2013 | Du |
| 8,390,918 B2 | 3/2013 | Wilcox |
| 8,441,432 B2 | 5/2013 | Zang |
| 8,582,196 B2 | 11/2013 | Walls |
| 8,582,197 B2 | 11/2013 | Liang |
| 8,593,718 B2 | 11/2013 | Comiskey |
| 8,654,436 B1 | 2/2014 | Feick |
| 8,670,174 B2 | 3/2014 | Sprague |
| 8,778,229 B2 | 7/2014 | Baesjou et al. |
| 8,786,935 B2 | 7/2014 | Sprague |
| 8,891,156 B2 | 11/2014 | Yang |
| 8,902,491 B2 | 12/2014 | Wang |
| 8,961,831 B2 | 2/2015 | Du |
| 9,018,299 B2* | 4/2015 | Hosaka .......... G02B 26/005 524/495 |
| 9,052,564 B2 | 6/2015 | Sprague |
| 9,114,663 B2 | 8/2015 | Ho |
| 9,158,174 B2 | 10/2015 | Walls |
| 9,279,906 B2 | 3/2016 | Kang |
| 9,291,872 B1 | 3/2016 | Lin |
| 9,341,915 B2 | 5/2016 | Yang |
| 9,348,193 B2 | 5/2016 | Hiji |
| 9,361,836 B1 | 6/2016 | Telfer |
| 9,366,935 B2 | 6/2016 | Du |
| 9,372,380 B2 | 6/2016 | Du |
| 9,382,427 B2 | 7/2016 | Du |
| 9,388,307 B2 | 7/2016 | Li |
| 9,423,666 B2 | 8/2016 | Wang |
| 9,428,649 B2 | 8/2016 | Li |
| 9,436,057 B2 | 9/2016 | Kang |
| 9,436,058 B2 | 9/2016 | Li |
| 9,470,917 B2 | 10/2016 | Lin |
| 9,557,623 B2 | 1/2017 | Wang |

(56) References Cited

U.S. PATENT DOCUMENTS

| | | |
|---|---|---|
| 9,664,978 B2 | 5/2017 | Arango |
| 9,670,367 B2 | 6/2017 | Li |
| 9,688,859 B2 | 6/2017 | Yezek |
| 9,726,957 B2 | 8/2017 | Telfer |
| 9,778,537 B2 | 10/2017 | Wang |
| 9,835,926 B2 | 12/2017 | Sprague |
| 2003/0048522 A1 | 3/2003 | Liang |
| 2003/0151029 A1 | 8/2003 | Hsu |
| 2003/0164480 A1 | 9/2003 | Wu |
| 2003/0175480 A1 | 9/2003 | Chen |
| 2003/0175481 A1 | 9/2003 | Chen |
| 2003/0179437 A1 | 9/2003 | Liang |
| 2003/0203101 A1 | 10/2003 | Haubrich |
| 2004/0030125 A1 | 2/2004 | Li |
| 2004/0136048 A1* | 7/2004 | Arango .............. C09D 11/30 359/296 |
| 2005/0012980 A1 | 1/2005 | Wilcox |
| 2009/0009852 A1 | 1/2009 | Honeyman |
| 2009/0206499 A1 | 8/2009 | Whitesides |
| 2009/0225398 A1 | 9/2009 | Duthaler |
| 2010/0148385 A1 | 6/2010 | Balko |
| 2011/0217639 A1 | 9/2011 | Sprague |
| 2012/0049125 A1 | 3/2012 | Du |
| 2012/0229885 A1* | 9/2012 | Chen .................. G02F 1/167 359/296 |
| 2013/0161565 A1 | 6/2013 | Laxton |
| 2013/0193385 A1 | 8/2013 | Li |
| 2013/0244149 A1 | 9/2013 | Wang |
| 2014/0011913 A1 | 1/2014 | Du |
| 2014/0050814 A1 | 2/2014 | Kang |
| 2014/0078024 A1 | 3/2014 | Paolini |
| 2014/0078573 A1 | 3/2014 | Comiskey |
| 2014/0078576 A1 | 3/2014 | Sprague |
| 2014/0078857 A1 | 3/2014 | Nelson |
| 2014/0104674 A1 | 4/2014 | Ting |
| 2014/0231728 A1 | 8/2014 | Du |
| 2014/0347718 A1 | 11/2014 | Duthaler et al. |
| 2015/0177590 A1 | 6/2015 | Laxton |
| 2015/0185509 A1 | 7/2015 | Wang |
| 2015/0241754 A1 | 8/2015 | Du |
| 2015/0301425 A1 | 10/2015 | Du |
| 2016/0059442 A1 | 3/2016 | Kang |
| 2016/0059617 A1 | 3/2016 | Kang |
| 2016/0170106 A1 | 6/2016 | Wang |

* cited by examiner

ELECTROPHORETIC MEDIUM

REFERENCE TO RELATED APPLICATIONS

This application claims benefit of Application Ser. No. 62/551,959, filed Aug. 30, 2017.

BACKGROUND OF INVENTION

This invention relates to an electrophoretic medium. More specifically, this invention relates to an electrophoretic medium comprising a specific type of fluid, and to microcell and other electrophoretic displays comprising such an electrophoretic medium.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

One type of display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT), E Ink Corporation, E Ink California, LLC. and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300, 932; 6,323,989; 6,377,387; 6,515,649; 6,538,801; 6,580,545; 6,652,075; 6,693,620; 6,721,083; 6,727, 881; 6,822,782; 6,831,771; 6,870,661; 6,927,892; 6,956,690; 6,958,849; 7,002,728; 7,038,655; 7,052, 766; 7,110,162; 7,113,323; 7,141,688; 7,142,351; 7,170,670; 7,180,649; 7,226,550; 7,230,750; 7,230, 751; 7,236,290; 7,247,379; 7,277,218; 7,286,279; 7,312,916; 7,375,875; 7,382,514; 7,390,901; 7,411, 720; 7,473,782; 7,532,388; 7,532,389; 7,572,394; 7,576,904; 7,580,180; 7,679,814; 7,746,544; 7,767, 112; 7,848,006; 7,903,319; 7,951,938; 8,018,640; 8,115,729; 8,199,395; 8,257,614; 8,270,064; 8,305, 341; 8,361,620; 8,363,306; 8,390,918; 8,582,196; 8,593,718; 8,654,436; 8,902,491; 8,961,831; 9,052, 564; 9,114,663; 9,158,174; 9,341,915; 9,348,193; 9,361,836; 9,366,935; 9,372,380; 9,382,427; and 9,423,666; and U.S. Patent Applications Publication Nos. 2003/0048522; 2003/0151029; 2003/0164480; 2003/0169227; 2003/0197916; 2004/0030125; 2005/ 0012980; 2005/0136347; 2006/0132896; 2006/ 0281924; 2007/0268567; 2009/0009852; 2009/ 0206499; 2009/0225398; 2010/0148385; 2011/ 0217639; 2012/0049125; 2012/0112131; 2013/ 0161565; 2013/0193385; 2013/0244149; 2014/ 0011913; 2014/0078024; 2014/0078573; 2014/ 0078576; 2014/0078857; 2014/0104674; 2014/ 0231728; 2014/0339481; 2014/0347718; 2015/ 0015932; 2015/0177589; 2015/0177590; 2015/ 0185509; 2015/0218384; 2015/0241754; 2015/ 0248045; 2015/0301425; 2015/0378236; 2016/ 0139483; and 2016/0170106;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 6,672,921; 6,751,007; 6,753,067; 6,781,745; 6,788, 452; 6,795,229; 6,806,995; 6,829,078; 6,833,177; 6,850,355; 6,865,012; 6,870,662; 6,885,495; 6,906, 779; 6,930,818; 6,933,098; 6,947,202; 6,987,605; 7,046,228; 7,072,095; 7,079,303; 7,141,279; 7,156, 945; 7,205,355; 7,233,429; 7,261,920; 7,271,947; 7,304,780; 7,307,778; 7,327,346; 7,347,957; 7,470, 386; 7,504,050; 7,580,180; 7,715,087; 7,767,126; 7,880,958; 8,002,948; 8,154,790; 8,169,690; 8,441, 432; 8,582,197; 8,891,156; 9,279,906; 9,291,872; and 9,388,307; and U.S. Patent Applications Publication Nos. 2003/0175480; 2003/0175481; 2003/0179437; 2003/0203101; 2013/0321744; 2014/0050814; 2015/ 0085345; 2016/0059442; 2016/0004136; and 2016/ 0059617;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445; and (i) Applications of displays; see for example U.S. Pat. Nos. 7,312,784 and 8,009,348.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

One critical factor in the performance of an electrophoretic medium is the choice of the fluid (sometimes referred to in the literature as the "suspending fluid", dispersing fluid", "dielectric fluid" or sometimes, rather illogically, "solvent" or "solvent mixture"). The chief difficulty lies in the number of desirable criteria for such a fluid and the difficulty of satisfying all of the criteria at the same time. Among such criteria are:
  a) low viscosity, to permit rapid movement of the charged particles in the applied electric field;
  b) low dielectric constant to allow the charged particle to experience a high electric field and thus move as rapidly as possible;
  c) chemical stability against, for example, radiation to which the medium may be exposed, particularly if use outdoors, and gases, especially oxygen, which may dissolve in the fluid;
  d) chemical compatibility with a wide variety of electrophoretic particles and other components present in the fluid, for example charge control agents;
  e) chemical compatibility with wall materials used to encapsulate the electrophoretic medium and/or continuous phase materials surrounding the electrophoretic medium;
  f) low water absorption, since the behavior of many electrophoretic particles is affected by even minor amounts of water present in the fluid;
  g) high density, to reduce the tendency for electrophoretic particles, which are often relatively dense metal oxide pigments, to settle out of the fluid; and
  h) high electrical resistivity to reduce current flow through the medium and hence reduce power consumption.

Additional criteria apply to electrophoretic media intended for use in microcells. Microcell cell displays (see the patents and applications listed in sub-Paragraph 5(c) above) are typically produced by a so-called "fill and seal" process, which comprises forming a series of recesses in a substrate, filling the electrophoretic medium into these cells and forming a sealing layer over the filled cells. Since it is essential that the cells be completely filled with the medium (to avoid air bubbles within the cells) but not overfilled (which would cause difficulties in securing the sealing layer to the cell walls), the fluid should have a low vapor pressure to reduce evaporation during the filling of the cells. (It should be noted that this problem with fluid evaporation is of much less concern in other applications of similar compositions; for example, in xerographic toners, where the non-encapsulated, single use toner composition can tolerate significant fluid evaporation during use.) It is also desirable that the properties of the fluid be chosen to minimize a problem known as "sag in", which is illustrated in FIG. 1 of the accompanying drawings. FIG. 1A is a schematic cross-section through a filled microcell medium (generally designated 100) comprising a substrate 102 on which are formed a series of microcells having bases 104 and cell walls 106, the cells being filled with an electrophoretic medium 108. The cells are sealed by a sealing layer 110. As illustrated in FIG. 1A, the width of the cells is substantially greater than the height of the cell walls 106, so that there is a substantial unsupported "run" of the sealing layer 110 between adjacent cell walls 106, and, depending upon the mechanical properties of the electrophoretic medium 108 and the sealing layer 110, there is a tendency for the sealing layer 110 to "sag in" in the central part of each cell, so that the depth of the electrophoretic medium in the central part of each cell in less than the height of the cell walls 106. Excessive sag in can lead to broken or cracked sealing layer, the consequent loss of fluid from the affected cells and hindered or non-existent switching. Moderate sag in can lead to surface roughness of the sealing layer, with associated optical problems due to light scattering, and may also cause problems with void creation during lamination processes, such as those typically used to attach the sealing layer to a backplane or other electrode structure. An electrophoretic device according to the present invention is illustrated in FIG. 1B. The electrophoretic device 150 of FIG. 1B comprises a layer of electrophoretic medium 108 and at least one electrode 120 disposed adjacent the layer of electrophoretic medium. The electrophoretic medium comprises two types of charged particles that are oppositely charged (114) in a fluid (156). The aforementioned problems regarding choice of fluids for use in electrophoretic media have frequently been acknowledged in the literature but are far from solved. In many cases, the prior art recites lengthy lists of possible fluids with no guidance as to the optimum fluid and without provided any exemplification of the properties of the fluids, apparently leaving the reader to optimize the fluid for each new electrophoretic medium.

For example, U.S. Pat. No. 5,453,121 describes an "ink jet ink composition wherein the liquid is selected from the group of aliphatic hydrocarbons, aromatic hydrocarbons, chlorinated solvents, polysiloxanes or mixtures thereof or is a vegetable oil selected from olive oil, safflower oil, sunflower oil, soya oil and linseed oil or mixtures thereof" These solvents are chosen to allow droplet formation with very little solvent, though the only relevant physical property of the liquids discussed is their electrical resistance.

U.S. Pat. No. 5,457,002 describes carrier fluids for toners to be used in electrophotography and reports that low volatility and low viscosity can be obtained using trimers of $C_9$ to $C_{11}$ α olefins. These materials would not be appropriate for use in electrophoretic displays because of their relatively high viscosity (~20 centistokes at 40° C.).

U.S. Pat. No. 5,411,656 describes an electrophoretic medium containing the sterically strained alkene 5-ethylidene-2-norbornene (CAS No. 16219-75-3). However, this compound is present in only a minor proportion in the fluid, being intended as an additive for chlorine gas absorption rather than as the main fluid.

U.S. Pat. No. 7,079,305 and others of E Ink Corporation teach that suitable solvents for encapsulated electrophoretic media should have low dielectric constant, high volume resistivity, low viscosity (less than 5 centistokes), low toxicity, low water solubility, high specific gravity, high boiling point and low refractive index, as well as density matching and chemical compatibility with the electrophoretic particles, stating. "Organic solvents, such as halogenated organic solvents, saturated linear or branched hydrocarbons, silicone oils, and low molecular weight halogen-containing polymers are some useful suspending fluids." Column 15, line 65 to column 16, line 27 of U.S. Pat. No. 7,079,305 contains a long list of possible fluids, including aliphatic and aromatic hydrocarbons, halocarbons, silicones and halogenated oligomers and polymers.

U.S. Pat. No. 7,545,557 describes an electrophoretic medium comprising a fluid that has chemical inertness, density matching to the particles, chemical compatibility with the particles, low dielectric constant, and low viscosity (for example 0.5 to 5 centistokes). Solvents that presumably meet these criteria, as described in the specification, include saturated linear or branched hydrocarbons, silicone oils, and low MW halogenated polymers. No guidance is provided on specific preferred fluids.

U.S. Pat. No. 7,679,814 describes the use of mixtures of partially hydrogenated aromatic hydrocarbons and terpenes for reduced haze in variable transmission electrophoretic media.

U.S. Pat. No. 8,786,935 teaches that fluids for electrophoretic displays preferably have low viscosity and low dielectric constant, and lists hydrocarbons (e. g., Isopar, decalin, 5-ethylidene-2-norbornene, paraffin oil), silicone oils, aromatic hydrocarbons (including toluene, alkylnaphthalene), and halogenated solvents (e.g. Halocarbon Oils from Halocarbon Product Corp or FC-43 from 3M Company). The patent gives no guidance as to how to select an optimal solvent from this rather lengthy list.

U.S. Pat. No. 8,670,174 describes non-polar solvents for use in highlighted or multicolor electrophoretic displays and, using language essentially identical to U.S. Pat. Nos. 5,582,700 and 7,940,450, states that suitable solvents may include "$C_{1-30}$ alkanes, $C_{2-30}$ alkenes, $C_{3-30}$ alkynes, $C_{3-30}$ aldehydes, $C_{3-30}$ ketones, $C_{2-30}$ ethers, $C_{2-30}$ esters, $C_{3-30}$ thioesters, terpenes, $C_{2-30}$ organosilanes, $C_{2-30}$ organosiloxanes and the like. Such non-polar solvents may be used alone or in combination." Again, no guidance is provided on how to select an optimal fluid from this long list.

U.S. Pat. Nos. 7,390,901 and 8,361,620 discuss the specific benefits of halogenated fluids, including high specific gravity, inertness, insensitivity to humidity, low dielectric constant, low viscosity, and low vapor pressure. These fluids are useful for particles with halogenated protective polymers or with fluorinated dyes. However, use of halogenated fluids tends to require use of halogenated auxiliary materials, such as charge control agents, and restricts the types of electrophoretic particles which can be used, which is a particular problem in full color displays.

U.S. Pat. No. 9,341,915 describes an electrophoretic fluid comprising charged pigment particles dispersed in a mixture of isoparaffins, wherein the mixture comprises isoparaffins having 8, 9 and 10 carbon atoms, and the total percentage of isoparaffins having less than 8 carbon atoms and isoparaffins having more than 10 carbon atoms is greater than 0% and less than 20% of the mixture.

Empirically, it has been found that, although Isopar E gives good results in encapsulated electrophoretic displays, it gives poor results in microcell displays due to high fluid loss and sag in. Isopar G, which has a lower vapor pressure than Isopar E, results in less fluid loss and lower sag in, but the higher viscosity of Isopar G results in slower switching speeds.

It has now been found that a limited class of $C_9$ fluids give excellent results in microcell electrophoretic displays with low fluid loss and low sag in. These fluids may also be useful in other types of electrophoretic media.

SUMMARY OF INVENTION

Accordingly, this invention provides an electrophoretic medium comprising a plurality of charged particles disposed in a fluid, wherein the fluid comprises at least about 75 percent by weight of a hydrocarbon selected from the group comprising monounsaturated nonenes, nonane and methyloctane.

The fluid present in the electrophoretic medium of the present invention may comprise at least about 90, and preferably at least about 95, percent by weight of the specified hydrocarbons. In a preferred embodiment, the fluid may consist essentially of the specified hydrocarbons. The fluid may comprise, for example, any one or more of "tripropylene" (a commercial material comprising a mixture of various isomers of nonenes), methyloctene, dimethylheptene, non-2-ene, and nonane (i.e., n-nonane and methyloctane).

As already indicated, the electrophoretic medium of the present invention is especially intended for use in microcell displays. Such microcell displays comprise a plurality of cavities formed in a substrate, and a sealing layer closing the open ends of the cavities, the cavities being filled with the electrophoretic medium of the invention. However, the electrophoretic medium of the present invention may be used in other types of both encapsulated and non-encapsulated media. Thus, the present invention extends to an electrophoretic display comprising a layer of an electrophoretic medium of the invention and at least one electrode disposed adjacent the layer of electrophoretic medium and arranged to apply an electric field thereto. Typically, such an electrophoretic display will have at least two electrodes disposed on opposed sides of the layer of electrophoretic material. The layer of electrophoretic medium may be unencapsulated or encapsulated. As previously described, in addition to microcell media, encapsulated media include media comprising a plurality of capsules, each of which itself comprises an internal phase containing the charged particles in the fluid, and a capsule wall surrounding the internal phase. Typically, the capsules are themselves held within a polymeric binder to form a coherent layer. The layer of electrophoretic medium may also be of polymer-dispersed type described above, with the charged particles and the fluid being present as a plurality of discrete droplets surrounded by a continuous phase of a polymeric material.

The (electrically) charged particles used in the electrophoretic medium of the present invention may be of any of the types used in prior art electrophoretic media, as described for example in the aforementioned E Ink and MIT patents and applications. Thus, for example, the electrophoretic medium may comprise only a single type of charged particles. Alternatively, the electrophoretic medium may comprise two types of particles bearing charges of opposite polarity. Full color displays may contain more than two types of charged particles; see, for example, U.S. Pat. No. 9,922,603, which describes electrophoretic media containing six different types of charged particles all having differing colors. Typically, the charged particles will carry polymeric coatings as described, for example, in U.S. Pat. Nos. 6,822,782 and 9,688,859.

The electrophoretic media of the present invention may also contain various additives as used in prior art electrophoretic media. Typically, the electrophoretic media will contain a charge control agent which serves to control the charge on the particles. The medium may also contain a polymer in the fluid to increase the bistability of the medium; see U.S. Pat. No. 7,170,670.

BRIEF DESCRIPTION OF DRAWINGS

As already indicated, FIG. 1A of the accompanying drawings is a schematic cross-section through a filled prior art microcell medium.

DETAILED DESCRIPTION OF THE INVENTION

As indicated above, the present invention provides an electrophoretic medium comprising a plurality of charged particles disposed in a fluid, wherein the fluid comprises at least about 75 percent by weight of a hydrocarbon selected from the group comprising monounsaturated nonenes, nonane and methyloctane. It has been found that this relatively narrow class of hydrocarbon fluids provide a nearly ideal combination of low conductivity, low viscosity, and low vapor pressure. These fluids were chosen to give unexpected improvements to both vapor pressure and viscosity over electrophoretic fluids described in the prior art, and are particularly good choices for fluids in microcell media produced by a fill and seal process.

Figure 1A:
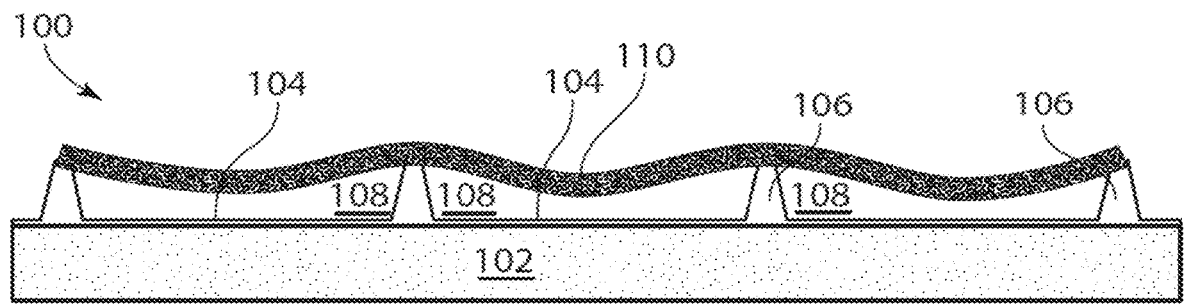
FIG. 1B illustrates a schematic of an electrophoretic device according to the present invention.
Figure 1B:
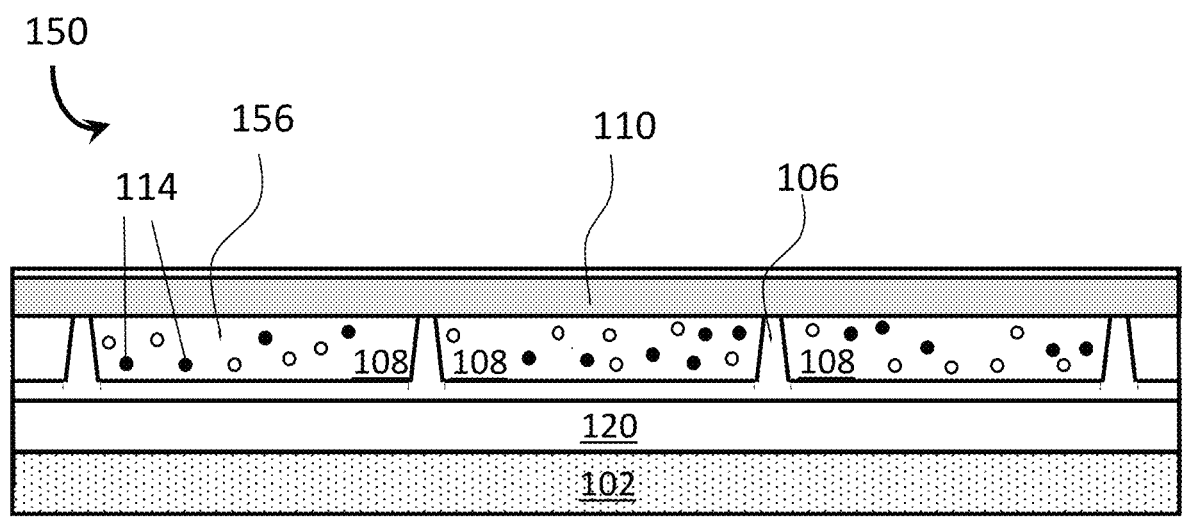
Figure 2:
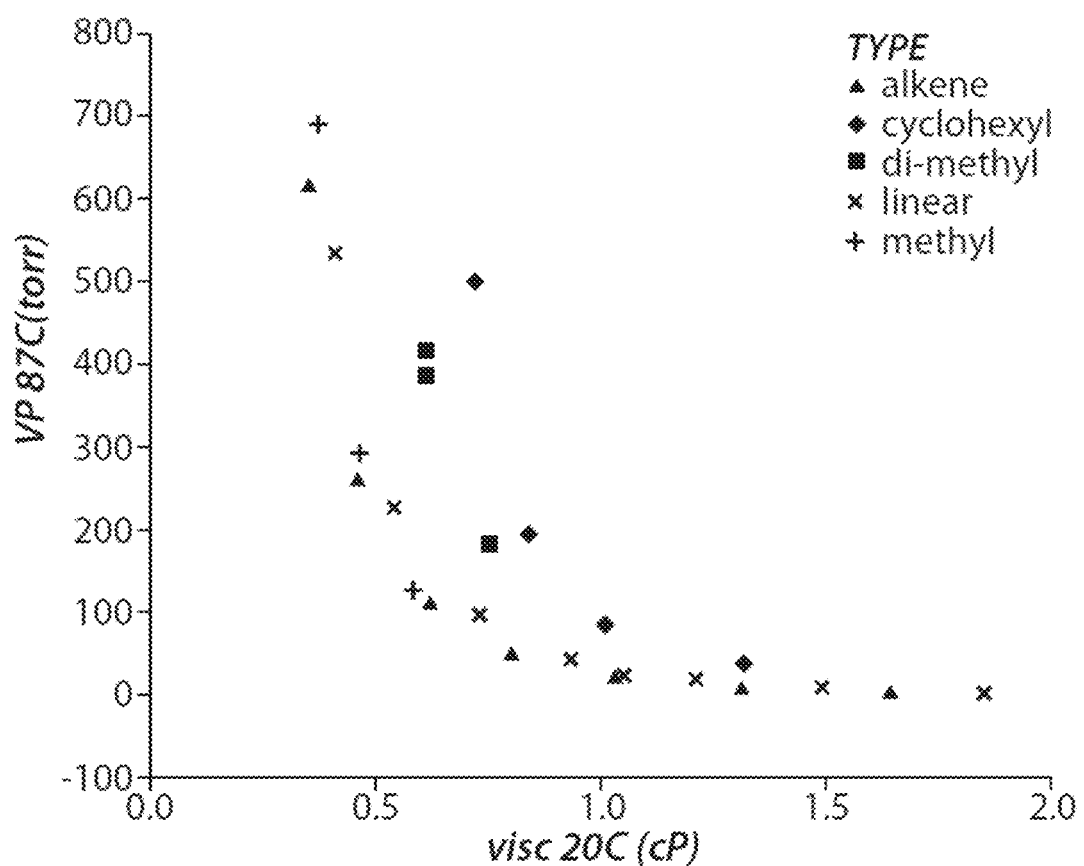
FIG. 2 is a graph plotting the vapor pressure of various hydrocarbons at 87° C. against their viscosity at 20° C.

As already indicated, fluids for use in microcell electrophoretic displays need to possess low conductivity, low viscosity, and low vapor pressure. Low conductivity can be ensured using a hydrocarbon fluid. However, because vapor pressure and viscosity are inversely correlated for most liquids, selection of a suitable fluid always involves some trade-off between these properties. FIG. 2 of the accompanying drawings shows the potential trade-offs by plotting calculated values for viscosity at 20° C. against vapor pressure at 87° C. for some common hydrocarbon fluids. Note that alkenes show a better vapor pressure-viscosity relationship than other classes of hydrocarbons, including linear, branched (di-methyl), and cyclic hydrocarbons. Monomethyl substituted linear alkanes also show some advantage.

Figure 3:
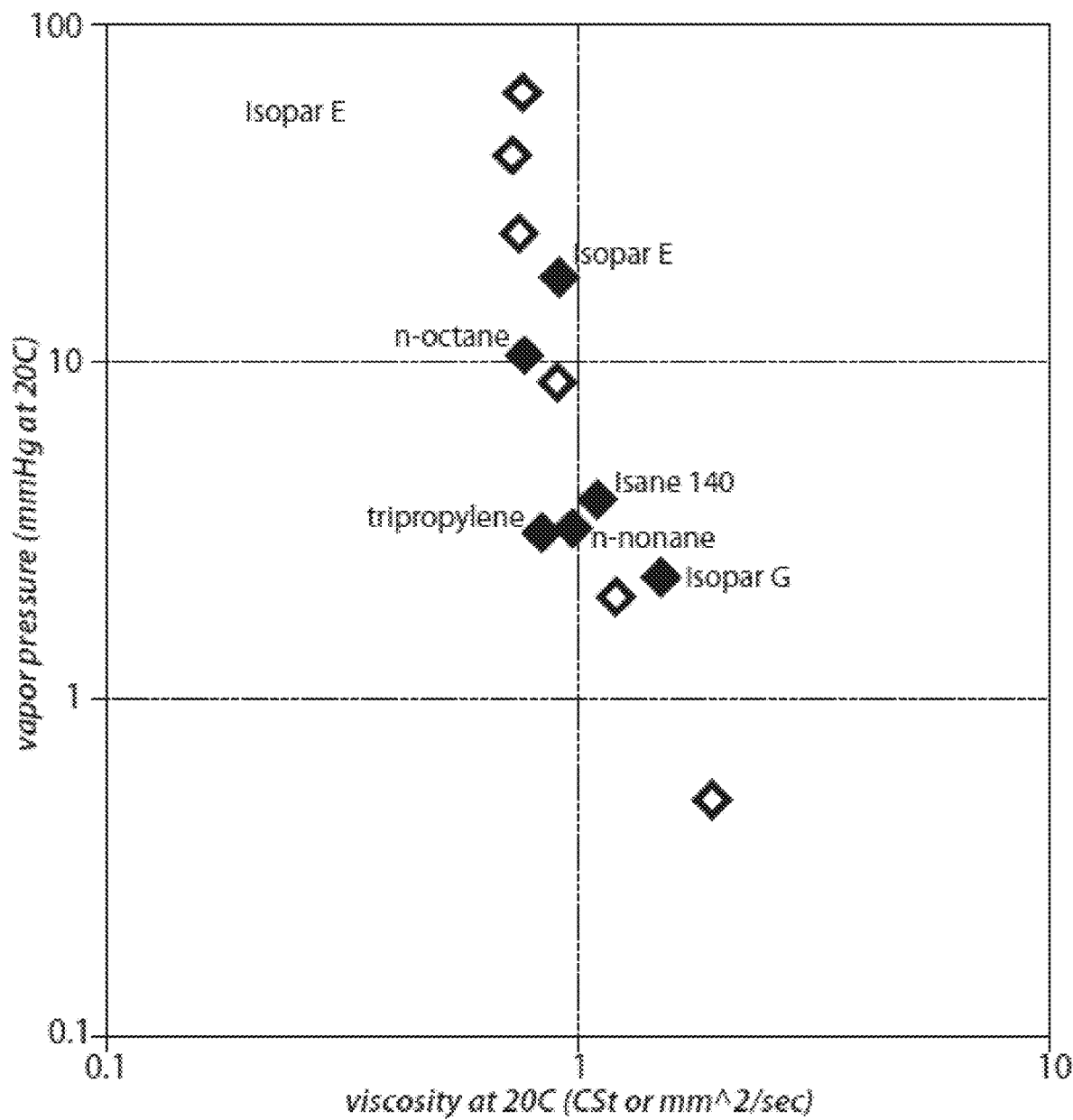
FIG. 3 is a graph similar to FIG. 3 but plotting the vapor pressure of various commercial solvents at 20° C. against their viscosity at the same temperature.

FIG. 3 is a plot similar to that of FIG. 2 but comparing the vapor pressure of various commercial hydrocarbon solvents at 20° C. against their viscosity at the same temperature. Commonly used electrophoretic suspending fluids are Isopar G, Isopar E and Isane IP 140 (a mixture of branched $C_9$ hydrocarbons). Isane IP 140 gives vapor pressure-viscosity behavior intermediate between Isopar E and Isopar G. Tripropylene has an even better viscosity-vapor pressure relationships than Isane IP 140, and is thus predicted to be a superior solvent for use in fill-and-seal microcell media; it has lower vapor pressure and lower viscosity than Isane IP 140.

From FIGS. 2 and 3, it may be expected that the previously specified group of nonene solvents, including tripropylene, methyloctene, dimethylheptene, non-1-ene, and the like, to be good choices for electrophoretic fluids. Two other solvents are included as part of the present invention, namely: n-nonane and methyloctane.

From the foregoing, it will be seen that the present invention can provide electrophoretic media with excellent switching speeds, because of the low viscosity fluid, and improved manufacturability, because of the low vapor pressure of the fluid. Although this invention has primarily been described in its application to microcell media, the advantageous combination of properties provided by the fluids used in the present invention are useful in other types of electrophoretic media.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electrophoretic medium comprising a plurality of charged particles disposed in a fluid, wherein the fluid comprises at least 75 percent by weight of a hydrocarbon selected from the group consisting of monounsaturated nonenes, and methyloctane.

2. The electrophoretic medium of claim 1 wherein the fluid comprises at least 90 percent by weight of the specified hydrocarbons.

3. The electrophoretic medium of claim 2 wherein the fluid comprises at least 95 percent by weight of the specified hydrocarbons.

4. The electrophoretic medium of claim 1 wherein the fluid comprises at least 75 percent by weight of any one or more of methyloctene, dimethylheptene, non-2-ene, and methyloctane.

5. The electrophoretic medium of claim 1 comprising at least two types of particles bearing charges of opposite polarity.

6. A microcell electrophoretic medium comprising a substrate having a plurality of cavities formed therein, and a sealing layer closing the open ends of the cavities, the cavities being filled with the electrophoretic medium of claim 1.

7. An electrophoretic display comprising a layer of an electrophoretic medium and at least one electrode disposed adjacent the layer of electrophoretic medium and arranged to apply an electric field thereto, wherein the electrophoretic medium is the electrophoretic medium of claim 1.

8. The electrophoretic display of claim 7 wherein the electrophoretic medium is confined within a plurality of capsules or microcells.

9. The electrophoretic display of claim 8 wherein the capsules are held within a polymeric binder to form a coherent layer.

* * * * *